US012296972B2

(12) United States Patent
Asanuma et al.

(10) Patent No.: US 12,296,972 B2
(45) Date of Patent: May 13, 2025

(54) AIRFLOW GUIDE STRUCTURE AND AIRCRAFT

(71) Applicant: HONDA MOTOR CO., LTD., Tokyo (JP)

(72) Inventors: Masahiko Asanuma, Saitama (JP); Susumu Mashio, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 126 days.

(21) Appl. No.: 18/069,843

(22) Filed: Dec. 21, 2022

(65) Prior Publication Data
US 2023/0192311 A1    Jun. 22, 2023

(30) Foreign Application Priority Data

Dec. 22, 2021 (JP) ................................. 2021-208129
Dec. 22, 2021 (JP) ................................. 2021-208182

(51) Int. Cl.
*B64D 33/10* (2006.01)
*B64C 29/00* (2006.01)

(52) U.S. Cl.
CPC .......... *B64D 33/10* (2013.01); *B64C 29/0025* (2013.01)

(58) Field of Classification Search
CPC .... B64C 29/0025; B64D 33/10; B64U 20/90; B64U 20/92; B64U 20/96
See application file for complete search history.

(56) References Cited

U.S. PATENT DOCUMENTS

| | | |
|---|---|---|
| 6,293,491 B1 | 9/2001 | Wobben |
| 9,120,560 B1 | 9/2015 | Armer |
| 9,415,878 B2 | 8/2016 | Wetzel |
| 9,586,690 B2 | 3/2017 | Rajashekara |
| 9,845,150 B2 | 12/2017 | Kroo |

(Continued)

FOREIGN PATENT DOCUMENTS

| | | |
|---|---|---|
| CN | 105939930 A | 9/2016 |
| CN | 213974458 U | 8/2021 |

(Continued)

OTHER PUBLICATIONS

Office Action issued for counterpart Japanese Application No. 2021-208129, transmitted from the Japanese Patent Office on Jun. 4, 2024 (drafted on May 30, 2024).

(Continued)

*Primary Examiner* — Nicholas McFall

(57) ABSTRACT

The aircraft includes a fuselage, a front wing and a rear wing provided to extend laterally from the fuselage for generating lift during cruise, a boom extending in a front-back direction supported by these wings to be spaced apart from the fuselage, a VTOL rotor supported on the boom and having one or more blades for generating thrust in a vertical direction during take-off and landing, a cooling system for cooling the VTOL rotor by using a radiator arranged within the boom, and an airflow guide structure provided in a part of the boom for guiding airflow generated by rotation of the blades to the radiator, and having an inlet provided on a side that faces toward a rotational direction of the blades relative to a rotational axis of the VTOL rotor, of a surface of the boom positioned below a plane of rotation of the blades.

19 Claims, 13 Drawing Sheets

(56) References Cited

U.S. PATENT DOCUMENTS

| | | |
|---|---|---|
| 9,932,108 B1 | 4/2018 | Viele |
| 10,029,785 B2 | 7/2018 | Niedzballa |
| 10,081,436 B1 | 9/2018 | Tian |
| 10,131,426 B2 | 11/2018 | Judas |
| 10,150,560 B2 | 12/2018 | Tighe |
| 10,350,960 B1 | 7/2019 | Long |
| 10,358,230 B2 | 7/2019 | Sahu |
| 10,472,064 B2 | 11/2019 | Tian |
| 10,577,091 B2 | 3/2020 | Parks |
| 10,836,485 B2 | 11/2020 | Welsh |
| 2013/0020429 A1 | 1/2013 | Kroo |
| 2015/0232191 A1 | 8/2015 | Wetzel |
| 2015/0367950 A1 | 12/2015 | Rajashekara |
| 2016/0207625 A1 | 7/2016 | Judas |
| 2016/0236774 A1 | 8/2016 | Niedzballa |
| 2017/0081040 A1 | 3/2017 | Pal |
| 2017/0267341 A1 | 9/2017 | Thomassin |
| 2018/0002023 A1 | 1/2018 | Tian |
| 2018/0072431 A1 | 3/2018 | Sahu |
| 2018/0093770 A1 | 4/2018 | Welsh |
| 2018/0105268 A1* | 4/2018 | Tighe .................. B64C 29/0025 |
| 2018/0170553 A1 | 6/2018 | Wang |
| 2018/0305005 A1 | 10/2018 | Parks |
| 2019/0047342 A1 | 2/2019 | Dietrich |
| 2019/0127056 A1 | 5/2019 | Weekes |
| 2019/0233107 A1 | 8/2019 | Tian |
| 2019/0323429 A1 | 10/2019 | McGee |
| 2019/0337613 A1 | 11/2019 | Villa |
| 2020/0115045 A1 | 4/2020 | Mermoz |
| 2022/0041275 A1 | 2/2022 | Tian |
| 2022/0363382 A1* | 11/2022 | McCann ................ B64U 20/94 |
| 2023/0036722 A1 | 2/2023 | Hanamitsu |
| 2023/0174247 A1 | 6/2023 | Ahyow |

FOREIGN PATENT DOCUMENTS

| | | |
|---|---|---|
| DE | 102016125656 A1 | 6/2018 |
| JP | H0427698 A | 1/1992 |
| JP | H11324672 A | 11/1999 |
| JP | 5676824 B2 | 2/2015 |
| JP | 2017081040 A | 5/2017 |
| JP | 6469488 B2 | 2/2019 |
| JP | 2020515031 A | 5/2020 |
| JP | 2020131781 A | 8/2020 |
| JP | 2021154802 A | 10/2021 |
| WO | 2021210065 A1 | 10/2021 |
| WO | 2021222528 A1 | 11/2021 |

OTHER PUBLICATIONS

Office Action issued for counterpart Japanese Application No. 2021-208182, transmitted from the Japanese Patent Office on Jun. 4, 2024 (drafted on May 30, 2024).

* cited by examiner

AIRFLOW GUIDE STRUCTURE AND AIRCRAFT

CROSS-REFERENCE TO RELATED APPLICATIONS

The contents of the following Japanese patent application(s) are incorporated herein by reference:
NO. 2021-208129 filed in JP on Dec. 22, 2021
NO. 2021-208182 filed in JP on Dec. 22, 2021

BACKGROUND

1. Technical Field

The present invention relates to an airflow guide structure and an aircraft.

2. Related Art

Conventionally, a vertical take-off and landing type aircraft (also called a vertical take-off and landing aircraft or simply an aircraft) is known which performs take-off and landing by elevating and lowering in a vertical direction with rotors for vertical take-off and landing (VTOL) arranged on the right side and the left side of the fuselage, and flies in a horizontal direction with a cruising rotor arranged on the back portion of the fuselage. In such an aircraft, the airflow generated by the VTOL rotor is used to cool a controller of the VTOL rotor. For example, Patent Document 1 discloses an enclosure in which an inlet is provided on an upper plane of a boom to which the VTOL rotor is attached, and the airflow is taken into the boom via the inlet and guided to a heat exchanger via an inlet cowl. Here, it is required that the airflow is efficiently guided into the boom via the inlet.

Patent Document 1: U.S. Pat. No. 10,150,560 Specification

DESCRIPTION OF EXEMPLARY EMBODIMENTS

The embodiments do not limit the invention according to the claims, and all the combinations of the features described in the embodiments are not necessarily essential to means provided by aspects of the invention.

Figure 1:
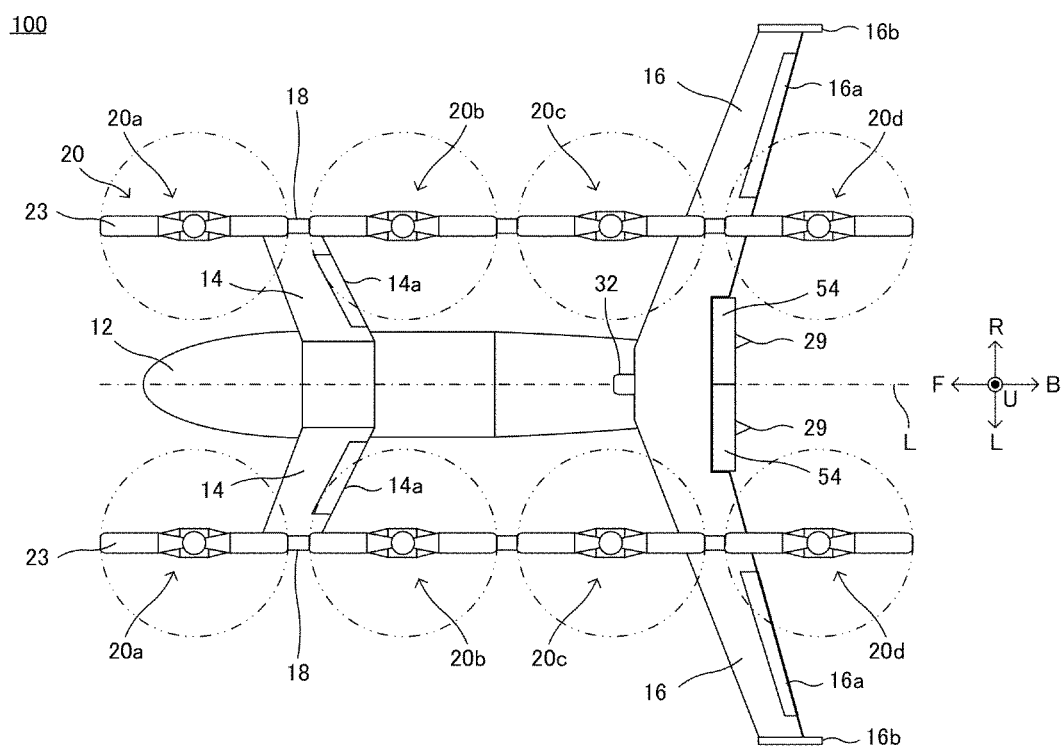
FIG. 1 illustrates a configuration of an aircraft according to the present embodiment in a top view.

FIG. 1 illustrates a configuration of an aircraft 100 according to the present embodiment in a top view. The aircraft 100 includes a rotor having an electric motor as its driving source, is a vertical take-off and landing aircraft that performs take-off and landing in a vertical direction by using rotors for vertical take-off and landing (VTOL) to generate thrust, as well as flies in a horizontal direction by using a cruising rotor (also called a cruise rotor) to generate thrust, and is a hybrid aircraft that is capable of operating an electric motor with electric power supplied from each of a battery and a motor generator while charging the battery with the motor generator. The aircraft 100 according to the present embodiment has an aircraft body that is configured to efficiently introduce the airflow generated by the VTOL rotor in particular (that is, down wash) to the radiator, and includes a fuselage 12, a front wing 14, a rear wing 16, two booms 18, eight VTOL rotors 20, two cruising rotors 29, a cooling system 60, and an airflow guide structure 70.

The fuselage 12 is a structure body for providing space for crews and passengers to board and to load cargo or the like, and for storing apparatuses such as the battery or the motor generator (neither are shown). The fuselage 12 is symmetric relative to a central axis L, and has a shape that extends in a front-back direction that is parallel to the central axis L and is thin in the left-right direction that is orthogonal to the central axis L in the horizontal plane. Here, the direction parallel to the central axis L is defined as the front-back direction, in which the left side of the drawing and the right side of the drawing are respectively the front (F) and back (B), and the direction orthogonal to the central axis L in the horizontal plane is defined as the width direction (or the left-right direction), in which the upper side of the drawing and the lower side of the drawing are respectively the right (R) and left (L). In addition, the vertical direction is orthogonal to each of these front-back direction and the width direction, in which the upward and downward in the vertical direction are also respectively referred to as upper (U) and lower (L). The fuselage 12 has a front end with a round curvature in a top view, and a rear end parallel to the width direction that is tapered to some extent relative to the barrel portion.

The front wing 14 is a wing body provided to extend laterally from the fuselage 12, and configured to generate lift during cruise, that is, by moving forward, which functions as a canard of the aircraft 100. The front wing 14 has a V-shape with two wing bodies respectively extending from the center portion to the front-left direction and the front-right direction, and is fixed on the upper portion of the front side of the barrel portion of the fuselage 12 at the center portion with the opening of the V-shaping facing toward the front. The front wing 14 includes elevators 14a arranged on the rear edge in each of the two wing bodies.

The rear wing 16 is a wing body provided to extend laterally from the fuselage 12, and configured to generate lift during cruise, that is, by moving forward, which functions as a swept-back wing configured to reduce air resistance. The rear wing 16 has a V-shape with two wing bodies respectively extending from the center portion to the rear-left direction and the rear-right direction, and is fixed on the upper portion of the rear end of the fuselage 12 at the center portion with the opening of the V-shaping facing toward the back via a pylon 32. The rear wing 16 includes elevons 16a arranged on the rear edge in each of the two wing bodies, and a vertical tail 16b arranged on a wing end.

Here, the wing area of the rear wing 16 is greater than that of the front wing 14, and the wing width of the rear wing 16 is wider than that of the front wing. In this manner, the lift generated by the rear wing 16 by moving forward is greater than the lift generated by the front wing 14, and the rear wing 16 functions as the main wing of the aircraft 100. Note that, the wing areas, the lengths or the like of the front wing 14 and the rear wing 16 may be defined based on the balance of the lift generated by each wing, the center of gravity, the posture of the aircraft body during cruise, and the like.

The two booms 18 are structure bodies that are supported by the front wing 14 and the rear wing 16 to be spaced apart from the fuselage 12 to the left and to the right, respectively, and functions to support or store each units in the configuration of the VTOL rotor 20 and the cooling system 60 described below. The two booms 18 each have a cylindrical shape extending in a front-back direction in a top view and a wing-shaped cross section with the upper side having a round curvature and the lower side tapered in a front view, and are paired to be arranged symmetrically with respect to the fuselage 12 (that is, the central axis L). Note that, the two booms 18 may be formed to extend in the front-back direction and have an arch-shape curvature in the width direction. The two booms 18 have their front side end portions positioned forward of the front wing 14 to be supported by the ends of the front wing 14 at the front side barrel portion (between the two VTOL rotors 20a, 20b on the front side), and have their rear side end portions positioned behind the rear wing 16 to be supported by the rear wing 16 at the rear side barrel portion (between the two VTOL rotors 20c, 20d on the rear side).

Figure 2A:
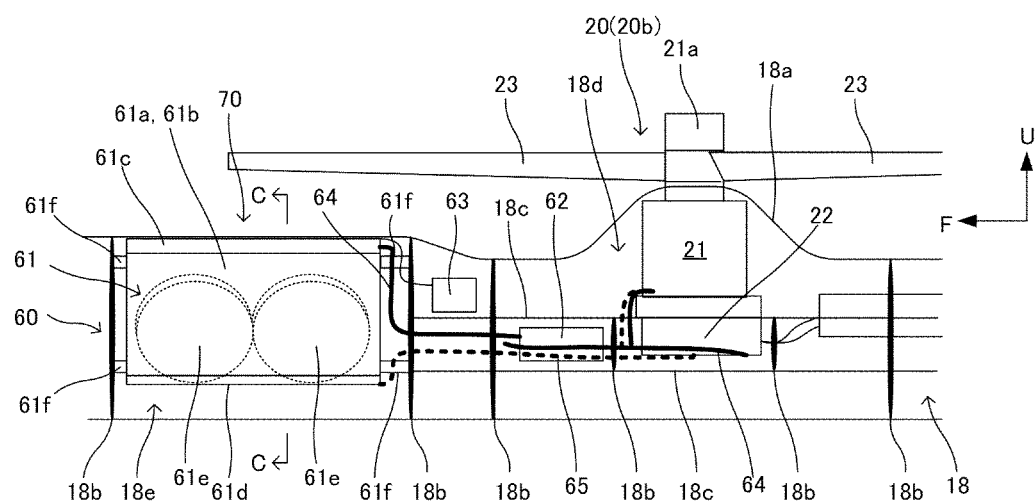
FIG. 2A illustrates an internal configuration of a boom.

FIG. 2A illustrates an internal configuration of the boom 18. The boom 18 includes a skin 18a, a rib 18b, and a spar 18c. The skin 18a is a member that constitutes the surface of the boom 18, and is molded into a cylindrical shape having a wing-shaped cross section and extending in the front-back direction. The skin 18a rises high above where the VTOL rotor 20 is arranged and spreads in the left-right direction to form a space 18d, and rises to some extent above where the cooling system 60 is arranged and spreads in the left-right direction to form a space 18e. The rib 18b is a wing-shaped plate member, and is arranged in a plurality of locations in the front-back direction to retain the skin 18a from the inside. Note that, the spaces 18d, 18e within the boom 18 are partitioned by the rib 18b. The spar 18c is a bar member that extends in the front-back direction, and constitutes a backbone for supporting the rib 18b and other members.

The eight VTOL rotors 20 (20a to 20d) are rotors that are supported by the two booms 18 to generate thrust in the vertical direction during take-off and landing. Four VTOL rotors 20a to 20d among the eight VTOL rotors 20 are supported at a substantially equal interval by the boom 18 on the left-hand side, and the remaining four VTOL rotors 20a to 20d are supported at a substantially equal interval by the boom 18 on the right-hand side. Here, the VTOL rotor 20a is arranged frontmost, the two VTOL rotors 20b, 20c are arranged to be front and back, respectively, between the front wing 14 and the rear wing 16, and the VTOL rotor 20d is arranged last. Among the VTOL rotors 20a to 20d on the left-hand side and the four VTOL rotors 20a to 20d on the right-hand side, each two VTOL rotors 20a to 20d which are located at the same position relative to the front-back direction form a pair, and are controlled to rotate in reverse directions from each other. Unless stated otherwise, each of the eight VTOL rotors 20a to 20d is referred to simply as the VTOL rotor 20.

The VTOL rotor 20 includes one or more blades 23, a motor 21, and an inverter 22. Note that, the motor 21 and the inverter 22 is also called electrical elements.

The one or more blades 23 are supported on the boom 18 as illustrated in FIG. 2A, and are vane-shaped members that generate thrust in the vertical direction by rotation thereof. In the present embodiment, the number of the blades 23 is two, but it may be any number including one or three or more. The one or more blades 23 are supported at a position higher than the front wing 14 and the rear wing 16. Note that, in FIG. 1, the plane of rotation of the one or more blades 23 of each VTOL rotor 20 is illustrated by using two-dotted lines.

The motor (an example of a rotational apparatus) 21 is an electric motor that includes a rotational axis 21a toward the up-down direction, via which the blade 23 fixed at the end is caused to rotate, and is supported by the spar 18c via a support member to be accommodated in the space 18d of the boom 18.

The inverter (an example of a control apparatus) 22 is an apparatus that receives DC power supply from the battery and converts it to AC power to supply it to the motor 21, and is supported by the spar 18c below the motor 21. The inverter 22 can control the rate of rotation of the motor 21.

The two cruising rotors 29 are rotors that are supported by the rear end of the fuselage 12 to generate thrust during cruise. The cruising rotors 29 are arranged side by side on the left and right to the central axis L in a cylindrical duct 54 fixed to the rear end of the fuselage 12, and have one or more blades that are supported in the duct 54 to generate a forward thrust by rotation thereof, motors that have rotational axes toward the front-back direction, via which the one or more blades fixed to the end are caused to rotate, and inverters that receive DC power supply from the battery and converts it to AC power to supply it to the motor (neither are shown). The inverter can control the rate of rotation of the motor.

The cooling system 60 is a system for cooling the motor 21 and the inverter 22 (which are called electrical components) that constitutes the VTOL rotor 20 in a liquid cooling manner by using the radiator 61 arranged within the boom 18. Although, in the present embodiment, one cooling system 60 is provided for one VTOL rotor 20, making a total of eight cooling systems 60, it is not limited thereto, and one cooling system 60 may be provided for a plurality of (for example, two) VTOL rotors 20. The cooling system 60 includes a radiator 61, a pump 62, a coolant fluid tank 63, and tubes 64, 65. Note that, water can be used as the coolant fluid.

Figure 2B:
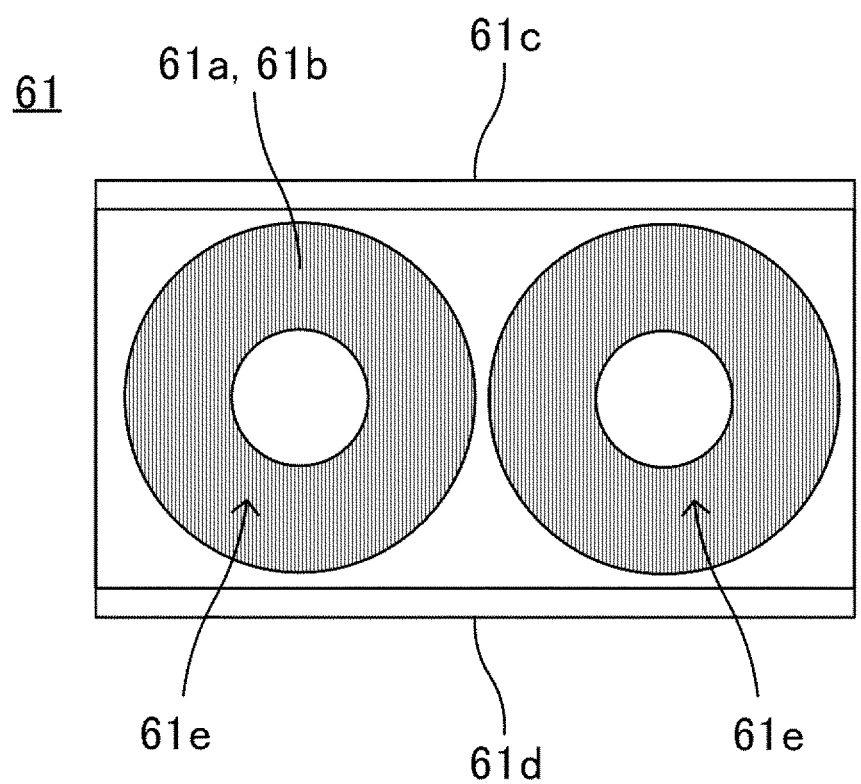
FIG. 2B illustrates a configuration of a radiator in a front view.
Figure 2C:
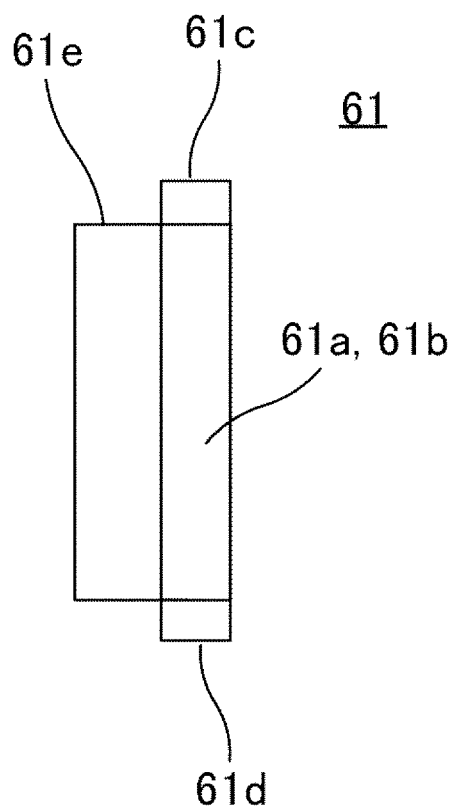
FIG. 2C illustrates a configuration of the radiator in a side view.

FIG. 2B and FIG. 2C illustrate configurations of the radiator 61 in a front view and a side view, respectively. The radiator 61 is a heat exchanger for cooling the coolant fluid to cool the motor 21 and the inverter 22. Note that, the radiator 61 is supported between the two ribs 18b by using a support member 61f, and is stored within the boom 18 by the airflow guide structure 70 described below. The arrangement in the boom 18 of the radiator 61 will be described below. The radiator 61 includes a plurality of tubes 61a for causing the coolant fluid to flow upward and downward, a plurality of fins 61b fixed to each of the plurality of tubes 61a to increase the surface area that the airflow contacts, an upper tank 61c for sending the coolant fluid to the plurality of tubes 61a, a lower tank 61d for receiving the coolant fluid from the plurality of tubes 61*a*, and two fans 61*e* for sending the airflow to the plurality of fins 61*b*.

The plurality of tubes 61*a* are arranged in a horizontal direction, assembled in a rectangular shape in the front view with the plurality of fins 61*b*, and constitutes the radiator main body with the upper tank 61*c* fixed on the upper side thereof and the lower tank 61*d* fixed on the lower side thereof. Operation of the pump 62 described below causes the coolant fluid having been heated by circling through the motor 21 and the inverter 22 to be fed to the upper tank 61*c* via the tube 64, to be cooled by flowing downward through each of the plurality of tubes 61*a* and sent to the lower tank 61*d*, and to be sent to the motor 21 and the inverter 22 via the tube 65. At this time, the two fans 61*e* operate to feed the airflow from one side (right-hand side in FIG. 2C) of the radiator main body so as to contact the plurality of fins 61*b*, thereby causing heat exchange between the airflow and the radiator main body. The heated airflow is leaked and discharged from the other side (left-hand side in FIG. 2C) of the radiator main body.

The pump 62 is connected to the radiator 61 via the tube 65, and receives the coolant fluid that is cooled therefrom, and feeds the same to the motor 21 and the inverter 22. In accordance with this, the coolant fluid having been heated through the motor 21 and the inverter 22 is fed to the radiator 61 via the tube 64.

The coolant fluid tank 63 is a container for storing the coolant fluid. For example, in a case where there is a shortage of the coolant fluid, the coolant fluid is sent from the coolant fluid tank 63 to the cooling circuit to supplement the coolant fluid.

The tubes 64, 65 are members for transporting the coolant fluid, and connects the radiator 61 and the pump 62 to the motor 21 and the inverter 22 to constitute a cooling circuit through which the coolant fluid circles.

Figure 2D:
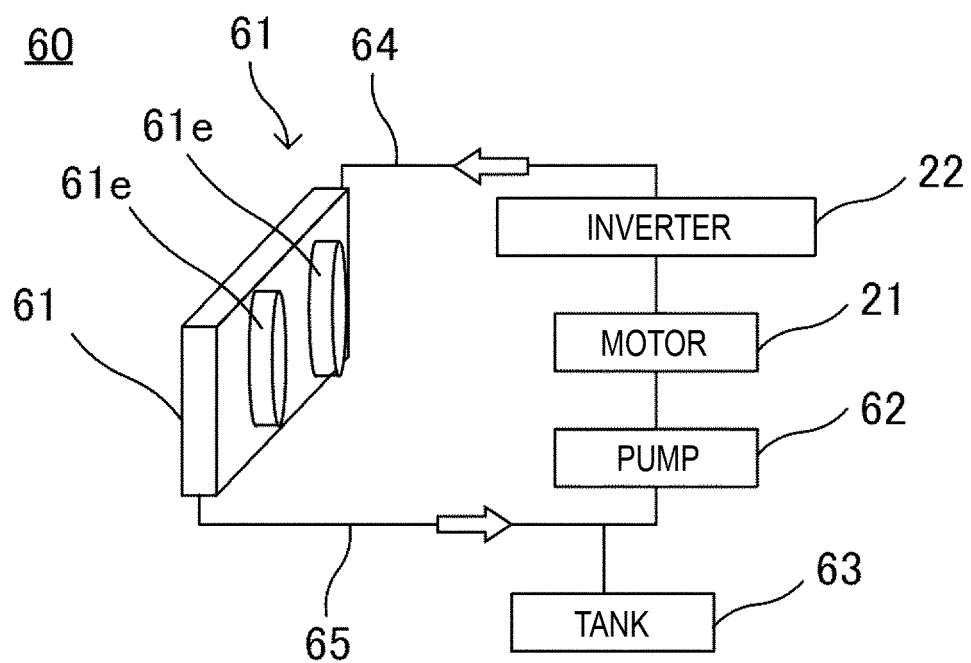
FIG. 2D illustrates a configuration of a cooling circuit.

FIG. 2D illustrates a configuration of the cooling circuit. The upper tank 61*c* of the radiator 61 is connected to the motor 21 and the inverter 22 by the tube 64. The lower tank 61*d* of the radiator 61 is connected to the motor 21 and the inverter 22 via the pump 62 by the tube 65. The coolant fluid tank 63 is connected to the tube 65. The operation of the pump 62 causes the coolant fluid heated in the motor 21 and the inverter 22 to be sent to the radiator 61 via the tube 64, and the coolant fluid cooled at the radiator 61 is sent to the motor 21 and the inverter 22 via the tube 65.

Note that, in the cooling circuit provided by the cooling system 60, the motor 21 and the inverter 22 are connected in series downstream of the pump 62, but they may alternatively be connected in parallel. In addition, other electrical components may be connected to the motor 21 and the inverter 22 in series or in parallel. In addition, in the cooling system 60, the cooling circuit is configured such that both of the motor 21 and the inverter 22 are cooled by one radiator 61, a pump 62, and a tank 63, but alternatively, two independent cooling circuits may be configured for individually cooling the motor 21 inverter 22 by connecting a radiator 61, a pump 62, and a tank 63 to each of the motor 21 and the inverter 22.

Note that, a cooling system having a configuration similar to that of the cooling system 60 may be provided to cool the electrical components of the cruising rotor 29.

Figure 3:
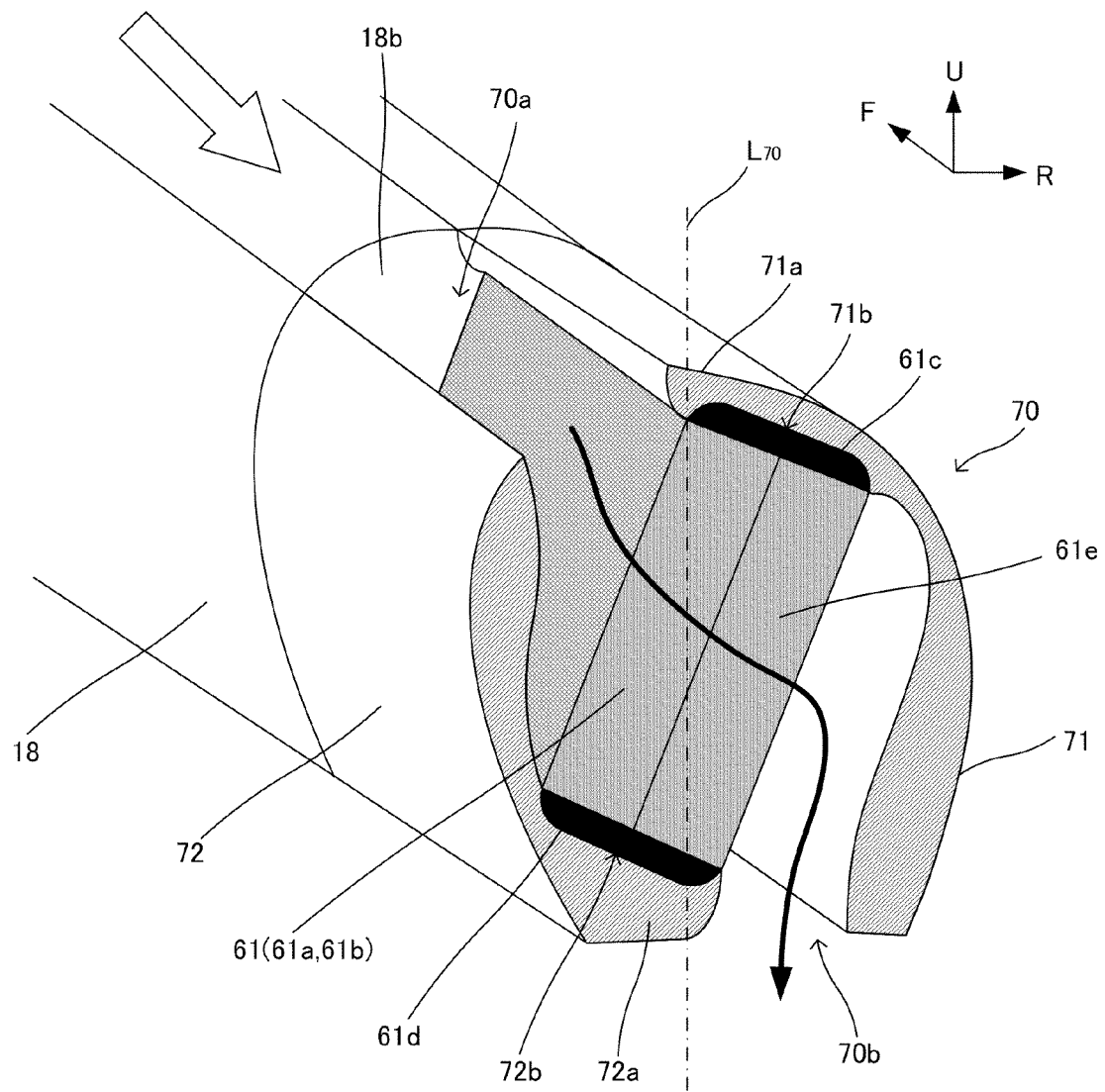
FIG. 3 illustrates a cross-sectional structure of an airflow guide structure relative to reference line CC in FIG. 2A.

FIG. 3 illustrates a cross-sectional structure of an airflow guide structure 70 relative to reference line CC in FIG. 2A. Note that, the central axis relative to the width direction of the airflow guide structure 70 is defined as the central axis $L_{70}$. The central axis $L_{70}$ is parallel to the rotational axis 21*a* of the VTOL rotor 20, and is overlapped with the rotational axis 21*a* in the front-back direction at the same position with respect to the width direction. The airflow guide structure 70 is a structure provided in a part of the boom 18 for guiding airflow generated by rotation of the one or more blades 23 into the radiator 61 within the boom 18, and includes an upper structure body 71 and a lower structure body 72.

The upper structure body 71 is a member having a substantially reversed L-shaped cross section forming an upper edge and a right-side edge by being inserted into the barrel of the boom 18. The upper structure body 71 may be molded to be solid, the end of the upper edge is tilted in an upper-left direction, a recess 71*b* extending obliquely downward in a front-back direction is formed on a lower surface of the upper edge, and the inner surface of the right-side edge(that is, the left surface) is formed to be in a streamline shape expanding rightward from the recess 71*b* on a plane that is orthogonal to the front-back direction, and returning leftward to some extent to extend downward therefrom. The upper edge of the upper structure body 71 functions as a beam 71*a* installed on the upper side of the inlet 70*a* formed between the upper structure body 71 and the lower structure body 72. In this manner, the bending stress applied to the boom 18 including the airflow guide structure 70 can be resisted.

The lower structure body 72 is a member having a substantially L-shaped cross section forming a lower edge and a left-side edge by being inserted into the barrel of the boom 18. The lower structure body 72 may be molded to be solid, and a recess 72*b* extending obliquely upward in a front-back direction is formed on a upper plane of the lower edge, the right end of the lower edge faces downward, the upper end of the left-side edge is tilted toward the upper-left direction, and the inner surface of the left-side edge (that is, the right surface) is molded to be in a streamline shape expanding rightward to some extent from the upper end on a plane that is orthogonal to the front-back direction, and returning leftward to some extent to extend downward therefrom. The lower edge of the lower structure body 72 functions as a beam 72*a* installed on the lower side of the outlet 70*b* formed between the upper structure body 71 and the lower structure body 72. In this manner, the bending stress applied to the boom 18 including the airflow guide structure 70 can be resisted.

By assembling the airflow guide structure 70 by using the upper structure body 71 and the lower structure body 72 having the configurations described above, an inlet 70*a* for taking in the airflow is formed on the upper side and an outlet 70*b* for letting out the airflow is formed on the lower side within the boom 18. First, the radiator 61 and the fan 61*e* are stacked, then, the upper structure body 71 is fixed to the spar 18*c*, the upper tank 61*c* of the radiator 61 is engaged into the recess 71*b* of the upper structure body 71 and a bracket provided in the upper tank 61*c* is fixed to the spar 18*c*. Then, the lower structure body 72 is fixed to the spar 18*c*, the lower tank 61*d* of the radiator 61 is engaged into the recess 72*b* of the lower structure body 72 and a bracket provided in the lower tank 61*d* is fixed to the spar 18*c*. In this manner, the airflow guide structure 70 is integrally assembled in the barrel of the boom 18. At this time, the radiator 61 and the fan 61*e* are supported between the two ribs 18*b* within the boom 18 by using the support member 61*f*.

In this manner, the inlet 70*a* is formed to be positioned on the side of one plane (suction plane) of the radiator 61 between the upper edge of the upper structure body 71 and the left-side edge of the lower structure body 72, and the outlet 70*b* is formed to be positioned on a side of the other plane (discharge plane) of the radiator 61 between the right-side edge of the upper structure body 71 and the lower edge of the lower structure body 72. At the same time, the radiator 61 will be arranged between the inlet 70*a* and the outlet 70*b* within the boom 18, and provided to be tilted with its suction plane facing toward the inlet 70*a* side and its discharge plane facing toward the outlet 70*b* side, with respect to the rotational axis 21*a* (that is, the central axis $L_{70}$) of the VTOL rotor 20. Further, two fans 61*e* are arranged on the discharge plane side of the radiator 61. Note that, the two fans 61*e* may be arranged don the suction plane side of the radiator 61.

Figure 4A:
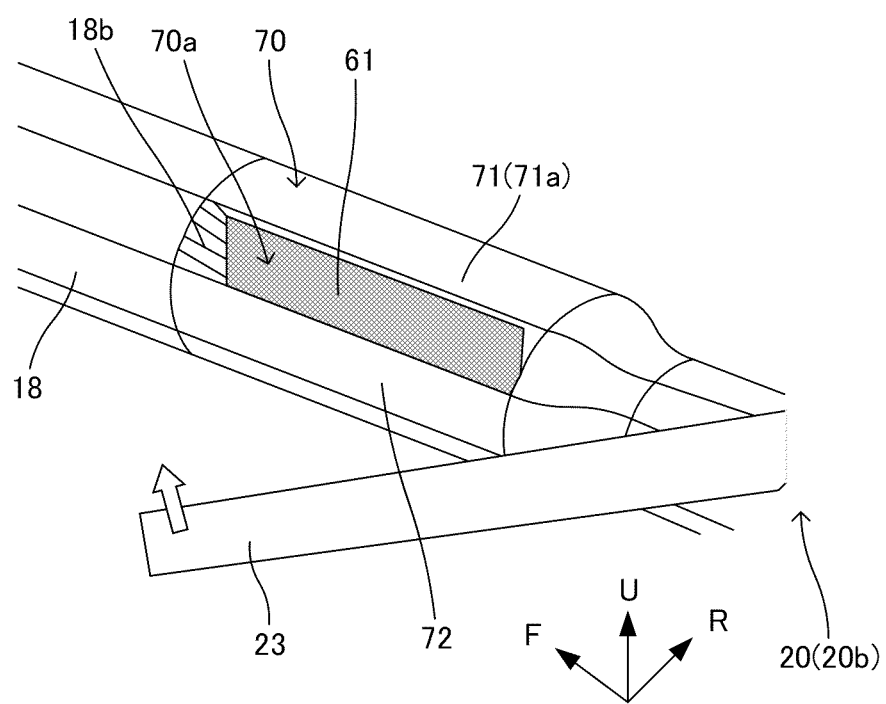
FIG. 4A illustrates a configuration of the upper side of the airflow guide structure and an arrangement of the inlet.

FIG. 4A illustrates a configuration of the upper side of the airflow guide structure 70 provided in the boom 18. The airflow guide structure 70 is a structure including a radiator 61 for cooling the VTOL rotor 20*b* on the right-hand side, as an example, and is provided in the boom barrel between the rotational axes 21*a* of the two VTOL rotors 20*a*, 20*b* (that is, the front side of the VTOL rotor 20*b*). By the airflow guide structure 70, the inlet 70*a* is provided between the rotational axes 21*a* of the two VTOL rotors 20*a*, 20*b* on the surface of the boom 18, and is provided on a side that faces toward the rotational direction (rightward in the present example) of the one or more blades 23, that is, the opposite side with respect to the rotational direction (left-hand side in the present example), with respect to the rotational axis 21*a* (the central axis $L_{70}$) of the VTOL rotor 20*b* in the front view, of a surface of the boom 18 positioned below the plane of rotation of the one or more blades 23 of at least one of the two VTOL rotors 20*a*, 20*b*, particularly the VTOL rotor 20*b* in the present example.

Here, the blade 23 of the VTOL rotor 20 has a pitch angle with respect to the plane of rotation to generate thrust (see FIG. 2A). Therefore, when the blade 23 rotates in a clockwise direction as illustrated in FIG. 4A, for example, an airflow is generated in a direction that is tilted toward the rotational movement direction of the blade 23 with respect to the downward direction, that is, the lower-right direction (the direction of the outlined arrow in FIG. 3). Accordingly, in the airflow guide structure 70, providing the inlet 70*a* on the left-hand side with respect the rotational axis 21*a* (the central axis $L_{70}$) of the VTOL rotor 20*b* in the front view can cause the airflow generated by rotation of the or more blades 23 of at least one rotor, particularly the VTOL rotor 20*b* in the present example to be efficiently guided to the radiator 61 within the boom 18 via the inlet 70*a*, when the two VTOL rotors 20*a*, 20*b* are activated.

In addition, as illustrated in FIG. 3, since the end on the upper edge of the upper structure body 71 of the airflow guide structure 70 is tilted toward the upper-left direction and the upper end of the left-side edge of the lower structure body 72 is tilted toward the upper-left direction, having the end of the upper edge of the upper structure body 71 and the upper end of the left-side edge of the lower structure body 72 opposing each other in the airflow guide structure 70 causes the inlet 70*a* to be provided to face toward the rotational direction (rightward in FIG. 3) of the blade 23 of the VTOL rotor 20*b* with respect to the central axis $L_{70}$ while being tilted toward the upper-left direction. In this manner, the airflow generated by rotation of the one or more blades 23 of the VTOL rotor 20*b* can be efficiently guided to the radiator 61 within the boom 18 via the inlet 70*a*.

Note that, the airflow guide structure 70 with respect to the VTOL rotor 20*b* may further be provided in the boom barrel between the rotational axes 21*a* of the two VTOL rotors 20*b*, 20*c* (that is, on the rear side of the VTOL rotor 20*b*), instead of or in addition to the boom barrel of the rotational axes 21*a* between the two VTOL rotors 20*a*, 20*b*. In such a case, the airflow guide structure 70 is provided is provided on a side that faces toward the rotational direction (leftward in the present example) of the one or more blades 23, that is, the opposite side with respect to the rotational direction (right-hand side in the present example), with respect to the rotational axis 21*a* (the central axis $L_{70}$) of the VTOL rotor 20*b* in the front view, of a surface of the boom 18 positioned below the plane of rotation of the one or more blades 23 of at least one of the two VTOL rotors 20*b*, 20*c*, particularly the VTOL rotor 20*b* in the present example. In addition, the inlet 70*a* is provided to be tilted toward the upper-right direction facing toward the rotational direction (leftward in the present example) of the blade 23 of the VTOL rotor 20*b* with respect to the central axis $L_{70}$. In this manner, the airflow generated by rotation of the one or more blades 23 of the VTOL rotor 20*b* can be efficiently guided to the radiator 61 within the boom 18 via the inlet 70*a*.

Figure 4B:
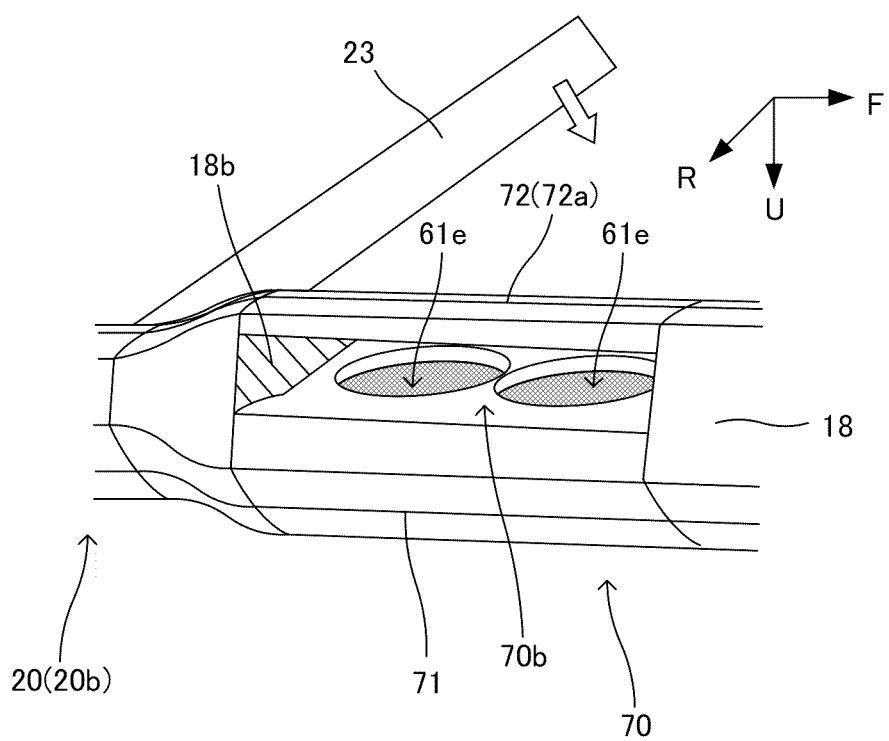
FIG. 4B illustrates a configuration of the lower side of the airflow guide structure and an arrangement of the outlet.

FIG. 4B illustrates a configuration of the lower side of the airflow guide structure 70 described above. By the airflow guide structure 70, the outlet 70*b* is provided at a position opposing the inlet 70*a* on the lower side of the boom 18. In this manner, the airflow introduced via the inlet 70*a* on the upper side is discharged downward from the outlet 70*b* on the lower side through the inside of the boom 18, thereby enabling the airflow to efficiently pass through the inside of the boom 18.

The outlet 70*b* is provided, among the lower portion of the boom 18, in the front view, on a side that follows the rotational direction (rightward in the present example) of the one or more blades 23 with respect to the rotational axis 21*a* (the central axis $L_{70}$) of the VTOL rotor 20*b* in the present example, that is, a side corresponding to the rotational direction (the right-hand side in the present example). That is, the outlet is positioned on a side that is opposite from the inlet 70*a* with respect to the rotational axis 21*a* (the central axis $L_{70}$) of the VTOL rotor 20*b* among the lower portion of the boom 18. In this manner, the flow channel within the boom 18 of the airflow introduced via the inlet 70*a* becomes longer so that the airflow is in contact with the radiator 61 for a long distance before being drawn out from the outlet 70*b*, thereby enabling the radiator 61 to be efficiently cooled.

In addition, as illustrated in FIG. 3, since the right end on the lower edge of the lower structure body 72 of the airflow guide structure 70 faces downward and the left-inner surface on the right-side edge of the upper structure body 71 is molded in a streamline shape facing downward, the right end on the lower edge of the lower structure body 72 and the lower end on the right-side edge of the upper structure body 71 opposes in the airflow guide structure 70, so that the outlet 70*b* faces further downward with respect to the inlet 70*a* that is provided to tilt toward the upper-left direction. In this manner, the airflow that is introduced inside the boom 18 toward the lower-right direction via the inlet 70*a* is drawn out further downward via the outlet 70*b*, thereby enabling the thrust in the vertical direction applied to the boom 18 (that is, the aircraft body of the aircraft 100) to be increased. In addition, the structure of such a airflow guide structure 70 enables the output of the fan 61*e* to be used as the thrust in the vertical direction applied to the boom 18 (that is, the aircraft body).

Note that, in the airflow guide structure 70, the inlet 70*a* is provided on the upper portion of the boom 18, but it is not limited thereto, and the airflow guide structure 70 may be provided at any position between the upper portion and the side portion of the boom 18 as long as the airflow generated by rotation of the one or more blades 23 can be efficiently introduced into the boom 18 when the VTOL rotor 20 is activated.

Figure 5:
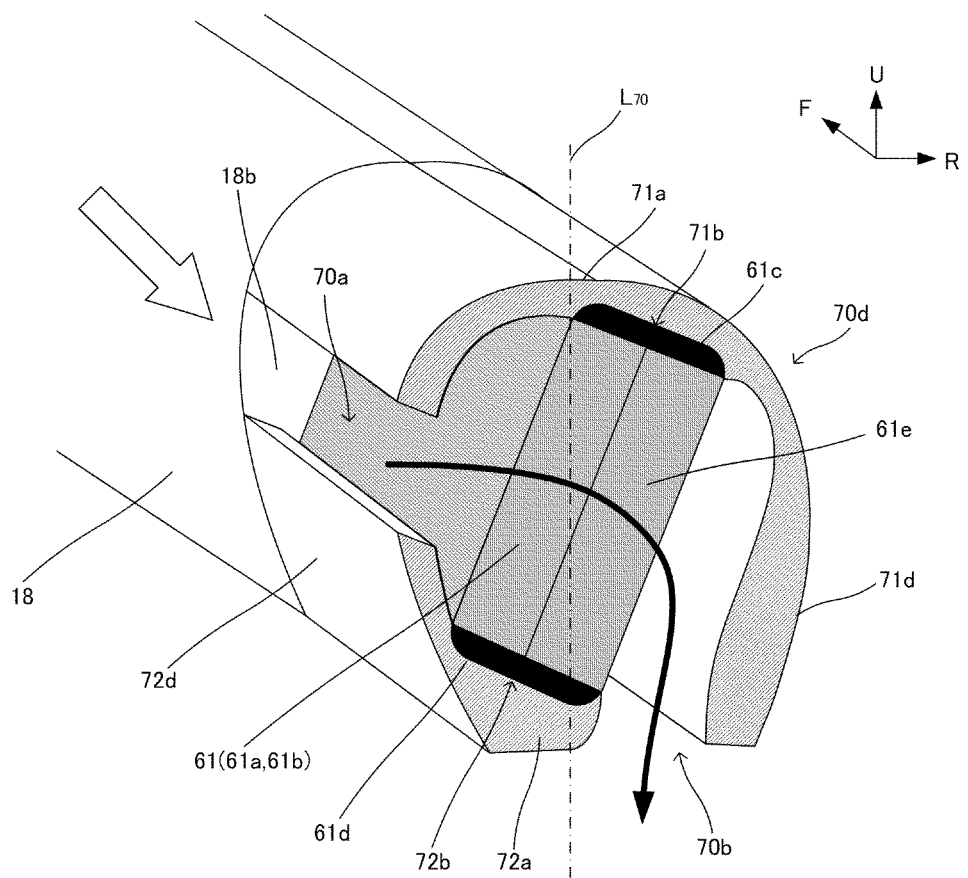
FIG. 5 illustrates a cross-sectional structure of the airflow guide structure according to a modification example.

FIG. 5 illustrates a cross-sectional structure relative to the reference line CC in FIG. 2A of the airflow guide structure 70d according to a modification example. Note that, the central axis relative to the width direction of the airflow guide structure 70d is defined as the central axis $L_{70}$. The central axis $L_{70}$ is parallel to the rotational axis 21a of the VTOL rotor 20, and is overlapped with the rotational axis 21a in the front-back direction at the same position with respect to the width direction. The airflow guide structure 70d is a structure for guiding airflow generated by rotation of the one or more blades 23 into the radiator 61 within the boom 18, and includes upper structure body 71d and a lower structure body 72d.

The upper structure body 71d is a member having a substantially 7-shaped cross section forming an upper edge and a right-side edge by being inserted in the barrel of the boom 18, and the end on the upper edge thereof extends to form a curvature further leftward with respect to the upper structure body 71 described above. The end on the upper edge is tilted toward the upper-left direction. The upper edge of the upper structure body 71d functions as a beam 71a installed on the upper side of the inlet 70a formed between the upper structure body 71d and the lower structure body 72. In this manner, the bending stress applied to the boom 18 including the airflow guide structure 70 can be resisted.

The lower structure body 72d is a member having a substantially L-shaped cross section forming the lower edge and the left-side edge by being inserted in the barrel of the boom 18, and the upper end on the left-side edge is positioned further downward with respect to the lower structure body 72 described above. The end on the left-side edge is tilted toward the upper-left direction. The lower edge of the lower structure body 72d functions as a beam 72a installed on the lower side of the outlet 70b formed between the upper structure body 71d and the lower structure body 72d. In this manner, the bending stress applied to the boom 18 including the airflow guide structure 70 can be resisted.

By assembling the airflow guide structure 70d by using the upper structure body 71d and the lower structure body 72d having the configurations described above, an inlet 70a for taking in the airflow is formed on the left side portion and an outlet 70b for letting out the airflow is formed on the lower side. The assembly of the airflow guide structure 70d is similar to that of the airflow guide structure 70 described above. In this manner, the inlet 70a is formed to be positioned on the side of one plane (suction plane) of the radiator 61 between the upper edge of the upper structure body 71d and the left-side edge of the lower structure body 72d, and the outlet 70b is formed to be positioned on a side of the other plane (discharge plane) of the radiator 61 between the right-side edge of the upper structure body 71d and the lower edge of the lower structure body 72d. At the same time, the radiator 61 will be arranged between the inlet 70a and the outlet 70b within the boom 18, and provided to be tilted with its suction plane facing toward the inlet 70a side and its discharge plane facing toward the outlet 70b side, with respect to the rotational axis 21a (that is, the central axis $L_{70}$) of the VTOL rotor 20.

As described above, since the blade 23 of the VTOL rotor 20 has a pitch angle with respect to the plane of rotation to generate thrust in the vertical direction, as illustrated in FIG. 2A, for example, when the blade 23 rotates, airflow is generated in a direction that is tilted toward the rotational movement direction of the blade 23 with respect to the downward direction, that is, in the lower-right direction (the direction of the outlined arrow in FIG. 5). Accordingly, in the airflow guide structure 70d, the inlet 70a is provided in the left side portion of the boom 18 in the front view, so that when the two VTOL rotors 20a, 20b are activated, the airflow generated by rotation of one or more blades 23 of at least one rotor, particularly the VTOL rotor 20b in the present example, can be efficiently guided to the radiator 61 within the boom 18 via the inlet 70a.

In addition, as illustrated in FIG. 5, since the end on the upper edge of the upper structure body 71d of the airflow guide structure 70d is tilted toward the upper-left direction and the upper end of the left-side edge of the lower structure body 72d is tilted toward the upper-left direction, having the end on the upper edge of the upper structure body 71d and the upper end of the left-side edge of the lower structure body 72d opposing each other in the airflow guide structure 70d causes the inlet 70a to be provided to face toward the rotational direction (rightward in FIG. 5) of the blade 23 of the VTOL rotor 20b with respect to the central axis $L_{70}$ while being tilted toward the upper-left direction. In this manner, the airflow generated by rotation of the one or more blades 23 of the VTOL rotor 20b can be efficiently guided to the radiator 61 within the boom 18 via the inlet 70a.

The rotational direction of the eight VTOL rotors 20 is determined such that the inversion torque generated by respective rotations thereof is cancelled and the reaction force and the thrust acting on the aircraft body are balanced. According to the position and rotational direction of the VTOL rotor 20, the position in the front-back direction at which the radiator 61 (that is, the airflow guide structure 70) is provided within the boom 18 and the position of the inlet 70a (and the outlet 70b) in the front-back direction and the width direction can be selected.

Figure 6A:
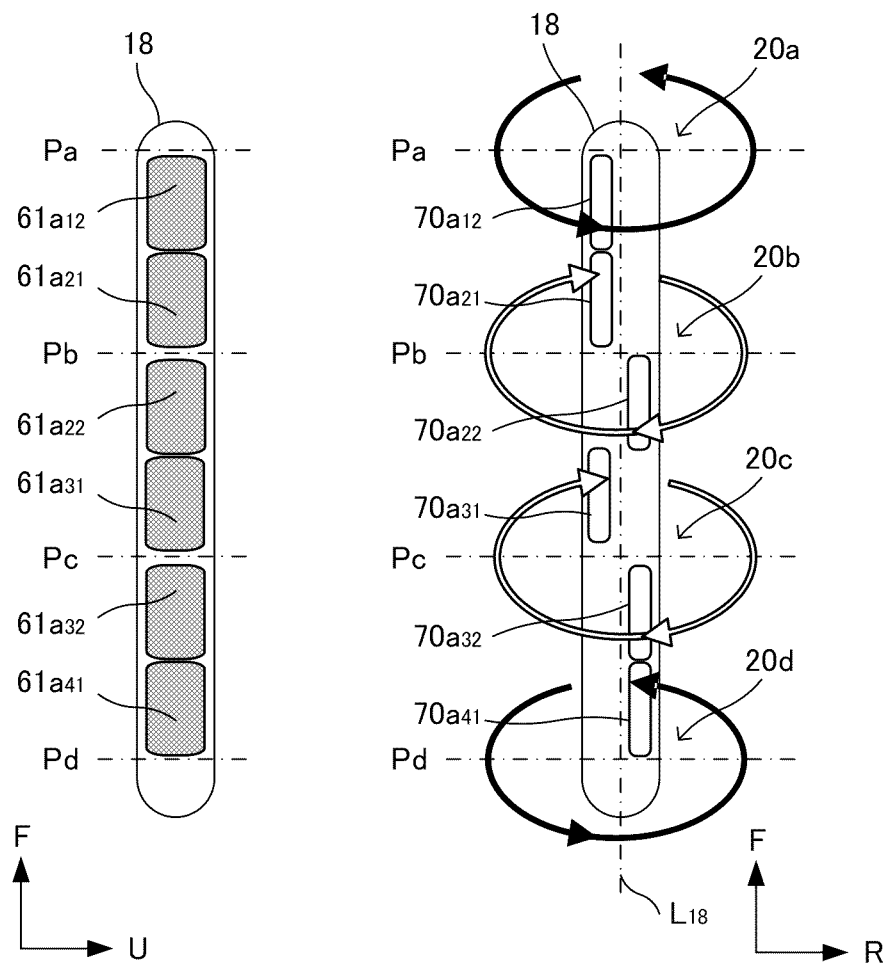
FIG. 6A illustrates a first example of placement positions of the radiator and the inlet within the boom.

FIG. 6A illustrates a first example of the placement position of the radiator 61 (that is, the airflow guide structure 70) relative to the front-back direction, and the placement position of the inlet 70a relative to the front-back direction and the width direction, within the boom 18. Here, the two booms 18 arranged on the left-hand side and the right-hand side of the fuselage 12 are symmetrically configured since the rotational directions of the paired VTOL rotors among the four VTOL rotors 20 respectively supported by the two booms 18 are reverse directions. Accordingly, here, only the position of the radiator 61 and the inlet 70a in the boom 18 on the right-hand side will be described. Placement positions Pa to Pd are each a placement position relative to the front-back direction of the VTOL rotors 20a to 20d, and the black arrow and the outlined arrow illustrate the rotational directions of the blades 23 of the VTOL rotors 20a to 20d. In the present example, the rotational directions of the VTOL rotors 20a, 20d are counter-clockwise, whereas the rotational directions of the VTOL rotors 20b, 20c are clockwise. Note that, in the top view, an axis extending in the front-back direction through which the rotational axes 21a of the VTOL rotors 20a to 20d passes is defined as a central axis $L_{18}$ of the boom 18.

Six placement positions for the radiator 61, namely, two placement positions (a placement position $61a_{12}$ on the rear side of the VTOL rotor 20a and a placement position $61a_{21}$ on the front side of the VTOL rotor 20b) between the placement positions Pa, Pb of the VTOL rotors 20a, 20b, two placement positions (a placement position $61a_{22}$ on the rear side of the VTOL rotor 20b and a placement position $61a_{31}$ on the front side of the VTOL rotor 20c) between the placement positions Pb, Pc of the VTOL rotors 20b, 20c, and two placement positions (a placement position $61a_{32}$ on the rear side of the VTOL rotor 20c and a placement position $61a_{41}$ on the front side of the VTOL rotor 20d) between the placement positions Pc, Pd of the VTOL rotors 20c, 20d are provided. Here, the radiator 61 for cooling the VTOL rotor 20a can be placed at the placement position $61a_{12}$, the radiator 61 for cooling the VTOL rotor 20b can be placed at the placement positions $61a_{21}$, $61a_{22}$, the radiator 61 for cooling the VTOL rotor 20c can be placed at the placement positions $61a_{31}$, $61a_{32}$, and the radiator 61 for cooling the VTOL rotor 20d can be placed at the placement position $61a_{41}$. The radiator 61 for cooling the VTOL rotor 20b may be placed only at one the placement positions $61a_{21}$, $61a_{22}$. The radiator 61 for cooling the VTOL rotor 20c may be placed only at one of the placement positions $61a_{31}$, $61a_{32}$.

Note that, the placement positions $61a_{12}$, $61a_{21}$ are at locations where the boom 18 is at least partially connected to the front wing 14, which makes it possible to fix the airflow guide structure 70 to the boom 18 more stably by using the frame of the front wing 14 or the like. In addition, the placement positions $61a_{22}$, $61a_{31}$ are at the barrel of the boom 18 that is supported between the front wing 14 and the rear wing 16, which makes it possible to fix the airflow guide structure 70 to the boom 18 more stably. In addition, the placement positions $61a_{32}$, $61a_{41}$ are at locations where the boom 18 is at least partially connected to the rear wing 16, which makes it possible to fix the airflow guide structure 70 to the boom 18 more stably by using the frame of the rear wing 16 or the like.

The position relative to the front-back direction of the inlet 70a is determined according to the placement position of the described above radiator 61. Here, the inlet 70a can be provided, on the surface of the boom 18 between the rotational axes 21a of the two VTOL rotors 20, in a region below the plane of rotation of one of the rotors. For example, an inlet $70a_{12}$ for guiding the airflow into the radiator 61 placed at the placement position $61a_{12}$ is provided in a region below the plane of rotation of one VTOL rotor 20a among the two VTOL rotors 20a, 20b. Here, the inlet $70a_{12}$ may be arranged such that a part thereof is overlapped in the region directly below the plane of rotation of the VTOL rotor 20a, or may be arranged within a region directly below the plane of rotation. In this manner, when the VTOL rotor 20a is activated, the airflow generated by rotation of the one or more blades 23 thereof can be efficiently guided to the radiator 61 placed at the placement position $61a_{12}$ via the inlet $70a_{12}$.

Further, the inlet $70a_{12}$ is positioned on a side that faces toward the rotational direction (rightward in the position of the inlet $70a_{12}$) of the one or more blades 23 of the VTOL rotor 20a with respect to the rotational axis 21a (the central axis $L_{18}$) of the VTOL rotor 20a, that is, on the opposite side (the left-hand side in the present example) with respect to the rotational direction. In addition, the inlet $70a_{12}$ may be provided to be tilted toward the upper-left direction when opposing the rotational direction (rightward in the position of the inlet $70a_{12}$) of the blade 23 of the VTOL rotor 20a with respect to the rotational axis 21a (the central axis $L_{18}$). In this manner, when the VTOL rotor 20a is activated, the airflow generated by rotation of the one or more blades 23 thereof can be efficiently guided to the radiator 61 placed at the placement position $61a_{12}$ via the inlet $70a_{12}$.

In addition, the inlet 70a can further be provided, on the surface of the boom 18 between the rotational axes 21a of the two VTOL rotors 20, in a region below the plane of rotation of the other one of the rotors. For example, an inlet $70a_{21}$ for guiding the airflow into the radiator 61 placed at the placement position $61a_{21}$ is provided in a region below the plane of rotation of the other VTOL rotor 20b among the two VTOL rotors 20a, 20b. Here, the inlet $70a_{21}$ may be arranged such that a part thereof is overlapped in the region directly below the plane of rotation of the VTOL rotor 20b, or may be arranged within a region directly below the plane of rotation. In this manner, when the VTOL rotor 20b is activated, the airflow generated by rotation of the one or more blades 23 can be efficiently guided to the radiator 61 placed at the placement position $61a_{21}$ via the inlet $70a_{21}$.

Further, the inlet $70a_{21}$ is positioned on a side that faces toward the rotational direction (rightward in the position of the inlet $70a_{21}$) of the one or more blades 23 of the VTOL rotor 20b with respect to the rotational axis 21a (the central axis $L_{18}$) of the VTOL rotor 20b, that is, on the opposite side (the left-hand side in the present example) with respect to the rotational direction. In addition, the inlet $70a_{21}$ may be provided to be tilted toward the upper-left direction when opposing the rotational direction (rightward in the position of the inlet $70a_{21}$) of the blade 23 of the VTOL rotor 20b with respect to the rotational axis 21a (the central axis $L_{18}$). In this manner, when the VTOL rotor 20b is activated, the airflow generated by rotation of the one or more blades 23 thereof can be efficiently guided to the radiator 61 placed at the placement position $61a_{21}$ via the inlet $70a_{21}$.

Since the VTOL motors 20a, 20b performs rotational movement in the same direction (rightward in the present example) between each of the rotational axes 21a (placement positions Pa, Pb) while the rotational directions of the VTOL motors 20a, 20b are opposite, the inlets $70a_{12}$, $70a_{21}$ are both positioned on a side (the left-hand side in the present example) facing toward the rotational direction with respect to the rotational axis 21a (the central axis $L_{18}$), and are provided to be tilted toward the upper-left direction when opposing the rotational direction Here, the inlets $70a_{12}$, $70a_{21}$ may be connected to form one common inlet. In this manner, when at least one of the VTOL rotors 20a, 20b is activated, the airflow generated by rotation of the one or more blades 23 thereof can be efficiently guided to the radiator 61 placed at the placement positions $61a_{12}$, $61a_{21}$ via the inlets $70a_{12}$, $70a_{21}$.

In addition, the inlet 70a can be provided, on the surface of the boom 18, in each of the region in the front and back of the rotational axis 21a (placement position Pb) thereof below the plane of rotation of the VTOL rotor 20b, for example. That is, in addition to the inlet $70a_{21}$ at the front side of the rotational axis 21a (the placement position Pb) of the VTOL rotor 20b, an inlet $70a_{22}$ for guiding the airflow to the radiator 61 placed at the placement position $61a_{22}$ can be further provided on the rear side. Here, the inlet $70a_{22}$ may be arranged such that a part thereof is overlapped in the region directly below the plane of rotation of the VTOL rotor 20b, or may be arranged within a region directly below the plane of rotation. In this manner, when the VTOL rotor 20b is activated, the airflow generated by rotation of the one or more blades 23 can be efficiently guided to the radiators 61 respectively placed at the placement positions $61a_{21}$, $61a_{22}$ via the two inlets $70a_{21}$, $70a_{22}$, and the VTOL rotor 20b can be efficiently cooled by using these two radiators 61. Note that, the radiator 61 may be placed only at one of the placement positions $61a_{21}$, $61a_{22}$, and the VTOL rotor 20b may be cooled by use thereof.

The two inlets $70a_{21}$, $70a_{22}$ respectively provided at the front and back of the rotational axis 21a (the placement position Pb) of the VTOL rotor 20b is positioned on a side that faces toward the rotational direction of the one or more blades 23 with respect to the rotational axis 21a (the placement position Pb) of the VTOL rotor 20b. That is, as described above, the inlet $70a_{21}$ is positioned on a side that faces toward the rotational direction (rightward in the position of the inlet $70a_{21}$) of the one or more blades 23 of the VTOL rotor 20b with respect to the rotational axis 21a (the central axis $L_{18}$) of the VTOL rotor 20b, that is, on the opposite side (the left-hand side in the present example) with respect to the rotational direction. The inlet $70a_{22}$ is positioned on a side that faces toward the rotational direction (leftward in the position of the inlet $70a_{22}$) of the one or more blades 23 of the VTOL rotor 20b with respect to the rotational axis 21a (the central axis $L_{18}$) of the VTOL rotor 20b, that is, on the opposite side (the right-hand side in the present example) with respect to the rotational direction. In addition, the inlet $70a_{22}$ may be provided to be tilted toward the upper-right direction when opposing the rotational direction (leftward in the position of the inlet $70a_{22}$) of the blade 23 of the VTOL rotor 20b with respect to the rotational axis 21a). In this manner, when the VTOL rotor 20b is activated, the airflow generated by rotation of the one or more blades 23 thereof can be efficiently guided to the radiators 61 respectively placed at the placement positions $61a_{21}$, $61a_{22}$ via the inlets $70a_{21}$, $70a_{22}$, and the VTOL rotor 20b can be efficiently cooled by using these two radiators 61. Note that, the radiator 61 maybe placed only at one of the placement positions $61a_{21}$, $61a_{22}$, and the VTOL rotor 20b may be cooled by use thereof.

Inlets $70a_{31}$, $70a_{32}$ are provided respectively at the front and back of the rotational axis 21a (the placement position Pc) of the VTOL rotor 20c. These inlets are configured to be similar to the inlets $70a_{21}$, $70a_{22}$ described above. In this manner, when the VTOL rotor 20c is activated, the airflow generated by rotation of the one or more blades 23 thereof can be efficiently guided to the radiators 61 respectively placed at the placement positions $61a_{31}$, $61a_{32}$ via the inlets $70a_{31}$, $70a_{32}$, and the VTOL rotor 20c can be efficiently cooled by using these two radiators 61. Note that, the radiator 61 may be placed only at one of the placement positions $61a_{31}$, $61a_{32}$, and the VTOL rotor 20c may be cooled by use thereof.

An inlet $70a_{41}$ is provided on the front side of the rotational axis 21a (the placement position Pd) of the VTOL rotor 20d. This is configured to be similar to, but symmetric to the inlet $70a_{12}$ described above. In this manner, when the VTOL rotor 20d is activated, the airflow generated by rotation of the one or more blades 23 thereof can be efficiently guided to the radiator 61 placed at the placement position $61a_{41}$ via the inlet $70a_{41}$.

Since the VTOL motors 20c, 20d performs rotational movement in the same direction (leftward in the present example) between each of the rotational axes 21a (placement positions Pc, Pd) while the rotational directions of the VTOL motors 20c, 20d are opposite, the inlets $70a_{32}$, $70a_{41}$ are both positioned on a side (the right-hand side in the present example) facing toward the rotational direction with respect to the rotational axis 21a (the central axis $L_{18}$), and are provided to be tilted toward the upper-right direction when opposing the rotational direction Here, the inlets $70a_{32}$, $70a_{41}$ may be connected to form one common inlet. In this manner, when at least one of the VTOL rotors 20c, 20d is activated, the airflow generated by rotation of the one or more blades 23 thereof can be efficiently guided to the radiator 61 placed at the placement positions $61a_{32}$, $61a_{41}$ via the inlets $70a_{32}$, $70a_{41}$.

Figure 6B:
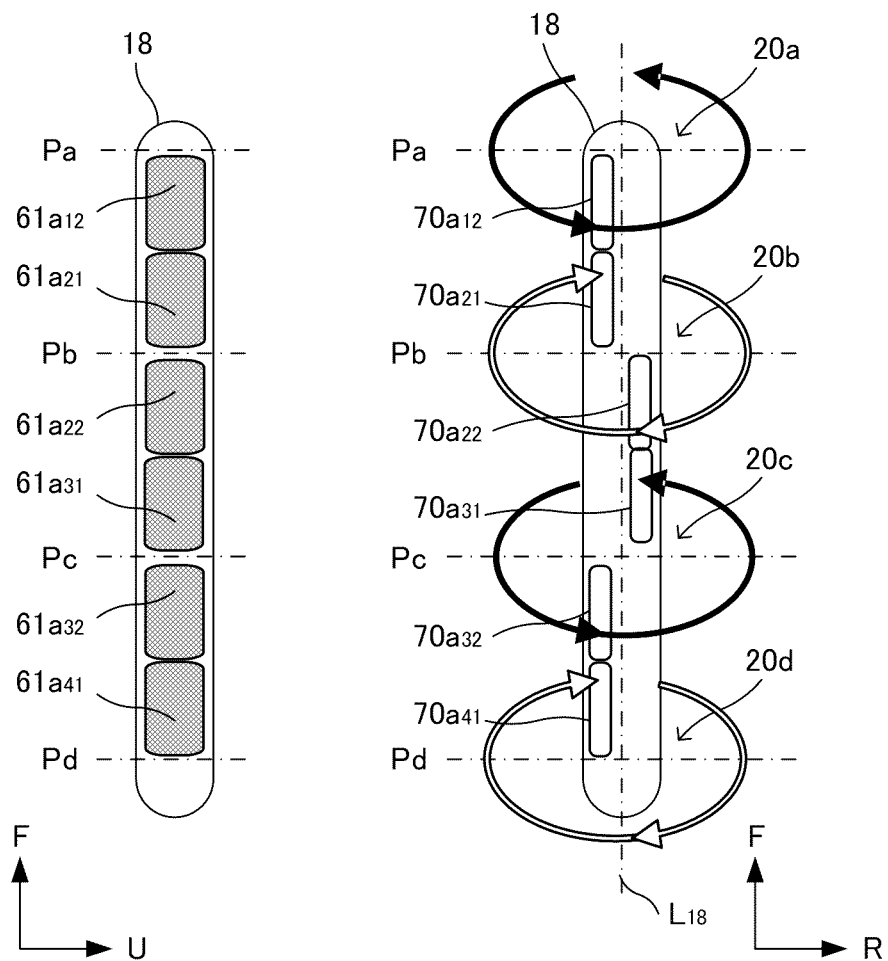
FIG. 6B illustrates a second example of placement positions of the radiator and the inlet within the boom.

FIG. 6B illustrates a second example of the placement position of the radiator 61 relative to the front-back direction, and the placement position of the inlet 70a relative to the front-back direction and the width direction, within the boom 18. Similar to the above, here, only the position of the radiator 61 and the inlet 70a in the boom 18 on the right-hand side will be described. The placement positions Pa to Pd, the black arrow, the outlined arrow, and the central axis $L_{18}$ are defined to be similar to the above. In the present example, the rotational directions of the VTOL rotors 20a, 20c are clockwise, whereas the rotational directions of the VTOL rotors 20b, 20d are counter-clockwise. There are six placement positions for the radiator 61, which is the same as above.

An inlet $70a_{12}$ is provided on the rear side of the rotational axis 21a (the placement position Pa) of the VTOL rotor 20a. This is configured to be similar to, but symmetric to the inlet $70a_{12}$ described above. Inlets $70a_{21}$, $70a_{22}$ are provided respectively at the front and back of the rotational axis 21a (the placement position Pb) of the VTOL rotor 20b. These inlets are configured to be similar to, but symmetric to the inlets $70a_{21}$, $70a_{22}$ described above. Inlets $70a_{31}$, $70a_{32}$ are provided respectively at the front and back of the rotational axis 21a (the placement position Pc) of the VTOL rotor 20c. These inlets are configured to be similar to the inlets $70a_{31}$, $70a_{32}$ described above. An inlet $70a_{41}$ is provided on the front side of the rotational axis 21a (the placement position Pd) of the VTOL rotor 20d. This is configured to be similar to, but symmetric to the inlet $70a_{41}$ described above.

Here, since the VTOL motors 20a, 20b performs rotational movement in the same direction (leftward in the present example) between each of the rotational axes 21a (placement positions Pa, Pb) while the rotational directions of the VTOL motors 20a, 20b are opposite, the inlets $70a_{12}$, $70a_{21}$ are both positioned on a side (the right-hand side in the present example) facing toward the rotational direction with respect to the rotational axis 21a (the central axis $L_{18}$), and are provided to be tilted toward the upper-right direction when opposing the rotational direction. Here, the inlets $70a_{12}$, $70a_{21}$ may be connected to form one common inlet. In this manner, when at least one of the VTOL rotors 20a, 20b is activated, the airflow generated by rotation of the one or more blades 23 thereof can be efficiently guided to the radiator 61 placed at the placement positions $61a_{12}$, $61a_{21}$ via the inlets $70a_{12}$, $70a_{21}$.

Since the VTOL motors 20b, 20c performs rotational movement in the same direction (rightward in the present example) between each of the rotational axes 21a (placement positions Pb, Pc) while the rotational directions of the VTOL motors 20b, 20c are opposite, the inlets $70a_{22}$, $70a_{31}$ are both positioned on a side (the left-hand side in the present example) facing toward the rotational direction with respect to the rotational axis 21a (the central axis $L_{18}$), and are provided to be tilted toward the upper-left direction when opposing the rotational direction. Here, the inlets $70a_{22}$, $70a_{31}$ may be connected to form one common inlet. In this manner, when at least one of the VTOL rotors 20b, 20c is activated, the airflow generated by rotation of the one or more blades 23 thereof can be efficiently guided to the radiator 61 placed at the placement positions $61a_{22}$, $61a_{31}$ via the inlets $70a_{22}$, $70a_{31}$.

In addition, since the VTOL motors 20c, 20d performs rotational movement in the same direction (leftward in the present example) between each of the rotational axes 21a (placement positions Pc, Pd) while the rotational directions of the VTOL motors 20c, 20d are opposite, the inlets $70a_{32}$, $70a_{41}$ are both positioned on a side (the right-hand side in the present example) facing toward the rotational direction with respect to the rotational axis 21a (the central axis $L_{18}$), and are provided to be tilted toward the upper-right direction when opposing the rotational direction. Here, the inlets $70a_{32}$, $70a_{41}$ may be connected to form one common inlet. In this manner, when at least one of the VTOL rotors 20c, 20d is activated, the airflow generated by rotation of the one or more blades 23 thereof can be efficiently guided to the radiator 61 placed at the placement positions $61a_{32}$, $61a_{41}$ via the inlets $70a_{32}$, $70a_{41}$.

Figure 7A:
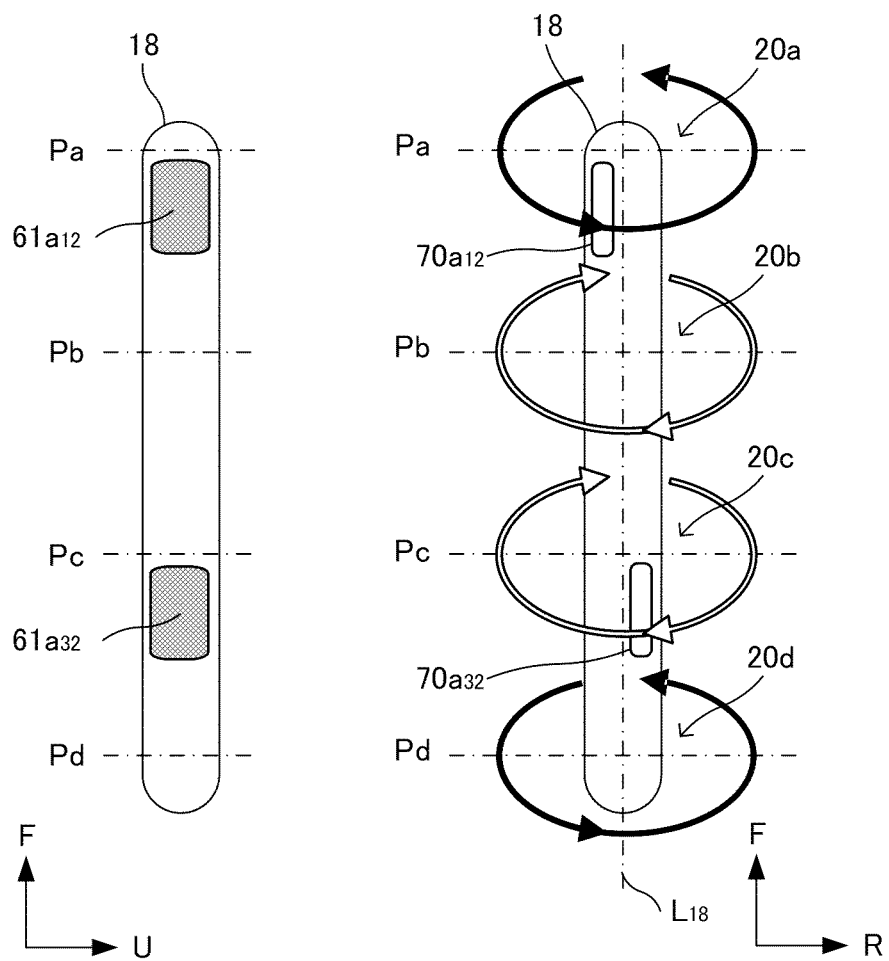
FIG. 7A illustrates a third example of placement positions of the radiator and the inlet within the boom.

FIG. 7A illustrates a third example of the placement position of the radiator 61 relative to the front-back direction, and the placement position of the inlet 70a relative to the front-back direction and the width direction, within the boom 18. Similar to the above, here, only the position of the radiator 61 and the inlet 70a in the boom 18 on the right-hand side will be described. The placement positions Pa to Pd, the black arrow, the outlined arrow, and the central axis $L_{18}$ are defined to be similar to the above. In the present example, the rotational directions of the VTOL rotors 20a, 20d are counter-clockwise, whereas the rotational directions of the VTOL rotors 20b, 20c are clockwise.

Tre are two placement positions for the radiator 61, that is, one placement position (a placement position $61a_{12}$ on the rear side of the VTOL rotor 20a) is provided between the placement positions Pa, Pb of the VTOL rotors 20a, 20b, and one placement position (a placement position $61a_{32}$ on the rear side of the VTOL rotor 20c is provided between the placement positions Pc, Pd of the VTOL rotors 20c, 20d. Here, the radiator 61 for cooling the VTOL rotors 20a, 20b can be placed at the placement position $61a_{12}$, and the radiator 61 for cool the VTOL rotors 20c, 20d can be placed at the placement position $61a_{32}$.

Note that, the placement positions $61a_{12}$ is at a location where the boom 18 is at least partially connected to the front wing 14, which makes it possible to fix the airflow guide structure 70 to the boom 18 more stably by using the frame of the front wing 14 or the like. In addition, the placement positions $61a_{32}$ is at a location where the boom 18 is at least partially connected to the rear wing 16, which makes it possible to fix the airflow guide structure 70 to the boom 18 more stably by using the frame of the rear wing 16 or the like.

The position relative to the front-back direction of the inlet 70a is determined according to the placement position of the described above radiator 61. Here, the inlet 70a can be provided, on the surface of the boom 18 between the rotational axes 21a of the two VTOL rotors 20, in a region below the plane of rotation of one of the rotors. For example, an inlet $70a_{12}$ for guiding the airflow into the radiator 61 placed at the placement position $61a_{12}$ is provided in a region below the plane of rotation of one VTOL rotor 20a among the two VTOL rotors 20a, 20b. Here, the inlet $70a_{12}$ may be arranged such that a part thereof is overlapped in the region directly below the plane of rotation of the VTOL rotor 20a, or may be arranged within a region directly below the plane of rotation. In this manner, when the VTOL rotor 20a is activated, the airflow generated by rotation of the one or more blades 23 thereof can be efficiently guided to the radiator 61 placed at the placement position $61a_{12}$ via the inlet $70a_{12}$.

Note that, the one or more blades 23 of the two VTOL rotors 20a, 20b rotate in a direction different from each other, and the inlet $70a_{12}$ may be provided on the surface of the boom 18 in a region partially including each of the region below the plane of rotation of the two VTOL rotors 20a, 20b. In this manner, when the two VTOL rotors 20a, 20b is activated, the airflow generated by rotation of the one or more blades 23 of each of the two VTOL rotors 20a, 20b can be efficiently guided to the radiator 61 within the boom 18 via the inlet $70a_{12}$.

Further, the inlet $70a_{12}$ is positioned on a side that faces toward the rotational direction (rightward in the position of the inlet $70a_{12}$) of the one or more blades 23 of the VTOL rotor 20a with respect to the rotational axis 21a (the central axis $L_{18}$) of the VTOL rotor 20a, that is, on the opposite side (the left-hand side in the present example) with respect to the rotational direction. In addition, the inlet $70a_{12}$ may be provided to be tilted toward the upper-left direction when opposing the rotational direction (rightward in the position of the inlet $70a_{12}$) of the one or more blades 23 of the VTOL rotor 20a with respect to the rotational axis 21a (the central axis $L_{18}$). In this manner, when the VTOL rotor 20a is activated, the airflow generated by rotation of the one or more blades 23 thereof can be efficiently guided to the radiator 61 placed at the placement position $61a_{12}$ via the inlet $70a_{12}$.

In addition, an inlet $70a_{32}$ for guiding the airflow into the radiator 61 placed at the placement position $61a_{32}$ is provided in a region below the plane of rotation of one VTOL rotor 20c among the two VTOL rotors 20c, 20d. This is configured to be similar to, but symmetric to the inlet $70a_{12}$ described above. In this manner, when the VTOL rotor 20c is activated, the airflow generated by rotation of the one or more blades 23 thereof can be efficiently guided to the radiator 61 placed at the placement position $61a_{32}$ via the inlet $70a_{32}$.

Figure 7B:
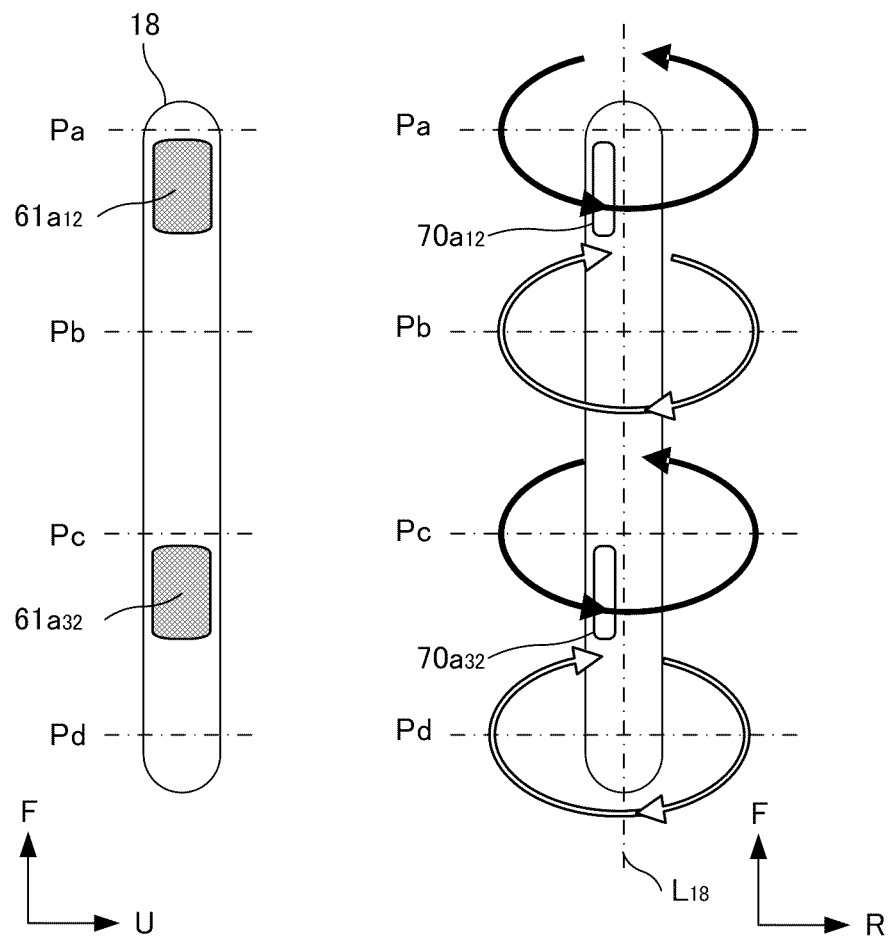
FIG. 7B illustrates a fourth example of placement positions of the radiator and the inlet within the boom.

FIG. 7B illustrates a fourth example of the placement position of the radiator 61 relative to the front-back direction, and the placement position of the inlet 70a relative to the front-back direction and the width direction, within the boom 18. Similar to the above, here, only the position of the radiator 61 and the inlet 70a in the boom 18 on the right-hand side will be described. The placement positions Pa to Pd, the black arrow, the outlined arrow, and the central axis $L_{18}$ are defined to be similar to the above. In the present example, the rotational directions of the VTOL rotors 20a, 20c are counter-clockwise, whereas the rotational directions of the VTOL rotors 20b, 20d are clockwise. There are two placement positions for the radiator 61, which is the same as above.

An inlet $70a_{12}$ is provided on the rear side of the rotational axis 21a (the placement position Pa) of the VTOL rotor 20a. This is configured to be similar to the inlet $70a_{12}$ described above. In this manner, when the VTOL rotor 20a is activated, the airflow generated by rotation of the one or more blades 23 thereof can be efficiently guided to the radiator 61 placed at the placement position $61a_{12}$ via the inlet $70a_{12}$.

An inlet $70a_{32}$ is provided on the rear side of the rotational axis 21a (the placement position Pc) of the VTOL rotor 20c. This is configured to be similar to, but symmetric to the inlet $70a_{32}$ described above. In this manner, when the VTOL rotor 20c is activated, the airflow generated by rotation of the one or more blades 23 thereof can be efficiently guided to the radiator 61 placed at the placement position $61a_{32}$ via the inlet $70a_{32}$.

The airflow guide structure 70 according to the present embodiment is a structure, in an aircraft 100 comprising a VTOL rotor 20 for generating thrust in the vertical direction during take-off and landing and a cooling system 60 for cooling the VTOL rotor 20, for guiding an airflow generated by rotation of one or more blades 23 of the VTOL rotor 20 to the radiator 61 of the cooling system 60, and includes an inlet 70a provided on a side that faces toward the rotational direction of the one or more blades 23 with respect to the rotational axis 21a of the VTOL rotor 20, among the surface that is positioned below the plane of rotation of the one or more blades 23, of the boom 18 that supports the one or more blades 23 upwardly and supports the inside of the radiator 61. According to this, the airflow guide structure 70 includes an inlet 70a provided on a side that faces toward the rotational direction of the one or more blades 23 with respect to the rotational axis 21a the VTOL rotor 20, of a surface of the boom 18 positioned below the plane of rotation of the one or more blades 23, thereby enabling the airflow generated by rotation of the one or more blades 23 to be efficiently guided to the radiator 61 within the boom 18 via the inlet 70a when the VTOL rotor 20 is activated.

In addition, the aircraft 100 according to the present embodiment includes a fuselage 12, a front wing 14 and a rear wing 16 that are provided to extend laterally from the fuselage 12 and configured to generate lift during cruise, a boom 18 extending in a front-back direction that is supported by these wings to be spaced apart from the fuselage 12, a VTOL rotor 20 that is supported on the boom 18, the VTOL rotor having one or more blades 23 configured to generate thrust in a vertical direction during take-off and landing, a cooling system 60 configured to cool the VTOL rotor 20 by using a radiator 61 arranged within the boom 18, and an airflow guide structure 70 that is a structure provided in a part of the boom 18 and configured to guide airflow generated by rotation of the one or more blades 23 to the radiator, the airflow guide structure having an inlet 70a that is provided on a side that faces toward a rotational direction of the one or more blades 23 relative to a rotational axis 21a of the VTOL rotor 20, of a surface of the boom 18 positioned below a plane of rotation of the one or more blades 23. According to this, the airflow guide structure 70 includes an inlet 70a provided on a side that faces toward the rotational direction of the one or more blades 23 with respect to the rotational axis 21a the VTOL rotor 20, of a surface of the boom 18 positioned below the plane of rotation of the one or more blades 23, thereby enabling the airflow generated by rotation of the one or more blades 23 to be efficiently guided to the radiator 61 within the boom 18 via the inlet 70a when the VTOL rotor 20 is activated.

The airflow guide structure 70 according to the present embodiment is a structure, in an aircraft 100 comprising two VTOL rotors 20 for generating thrust in the vertical direction during take-off and landing and a cooling system 60 for cooling the VTOL rotors 20, for guiding an airflow generated by rotation of one or more blades 23 of at least one rotor among the two VTOL rotors 20 to the radiator 61 of the cooling system 60, and includes an inlet 70a provided between the rotational axes 21a of the two VTOL rotors 20 on a surface of the boom 18 that supports the one or more blades 23 upwardly and supports the inside of the radiator 61.

In addition, the aircraft 100 according to the present embodiment includes a fuselage 12, a front wing 14 and a rear wing 16 that are provided to extend laterally from the fuselage 12 and configured to generate lift during cruise, a boom 18 extending in a front-back direction that is supported by these wings to be spaced apart from the fuselage 12, at least two VTOL rotors 20 that are supported on the boom 18, the VTOL rotors respectively having one or more blades 23 configured to generate thrust in a vertical direction during take-off and landing, a cooling system 60 configured to cool the two VTOL rotors 20 by using a radiator 61 arranged within the boom 18, and an airflow guide structure 70 that is a structure provided in a part of the boom 18 and configured to guide airflow generated by rotation of the one or more blades 23 of at least one rotor among the two VTOL rotors 20 to the radiator 61, the airflow guide structure having an inlet 70a that is provided between the rotational axes 21a of the two VTOL rotors 20 on a surface of the boom 18. According to this, the airflow guide structure 70 includes an inlet 70a provided between the rotational axes 21a of the two VTOL rotors 20 on the surface of the boom 18, thereby enabling the airflow generated by rotation of the one or more blades 23 of at least one of the two VTOL rotors 20, when activated, to be efficiently guided to the radiator 61 within the boom 18 via the inlet 70a.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Other Possible Claims

[Item 1] An aircraft comprising:
fuselage;
a wing body that is provided to extend laterally from the fuselage and configured to generate lift during cruise;
a boom extending in a front-back direction that is supported by the wing body to be spaced apart from the fuselage;
at least two rotors that are supported on the boom, the at least two rotors respectively having one or more blades configured to generate thrust in a vertical direction during take-off and landing;
a cooling apparatus configured to cool the two rotor by using a radiator arranged within the boom; and
an airflow guide structure that is a structure provided in a part of the boom and configured to guide airflow generated by rotation of the one or more blades of at least one rotor among the two rotors to the radiator, the airflow guide structure having an inlet that is provided between rotational axes of the two rotors on a surface of the boom.

[Item 2] The aircraft according to item 1, wherein the inlet is provided in a region below a plane of rotation of the one rotor on a surface of the boom.

[Item 3] The aircraft according to item 2, wherein the inlet is positioned on a side that faces toward a rotational direction of one or more blades on the one rotor with respect to a rotational axis of the one rotor.

[Item 4] The aircraft according to item 2 or 3, wherein the inlet is further provided in a region below a plane of rotation of the other rotor among the two rotors on a surface of the boom.

[Item 5] The aircraft according to item 4, wherein the inlet that is further provided is positioned on a side that faces toward a rotational direction of one or more blades of the other rotor with respect to a rotational axis of the other rotor.

[Item 6] The aircraft according to any one of items 1 to 5, wherein the inlet is provided in each of a region in front and back of a rotational axis of the one rotor below a plane of rotation of the one rotor on surface of the boom.

[Item 7] The aircraft according to item 6, wherein two inlets respectively provided in a region in front and back of a rotational axis of the one rotor are positioned on a side that faces toward a rotational direction of one or more blades of the one rotor with respect to a rotational axis of the one rotor.

[Item 8] The aircraft according to item 1, wherein
one or more blades of the two rotors rotate in a direction different from each other, and
the inlet is provided in a region partially including a region below a plane of rotation of each of the two rotors n a surface of the boom.

[Item 9] The aircraft according to item 8, where the inlet is positioned on a side that faces a rotational direction of one or more blades of the two rotors the respect to a rotational axis of the two rotors.

[Item 10] The aircraft according to item 8 or 9, wherein the inlet is provided on the boom to be tilted toward a rotational direction of one or more blades of each of the two rotors with respect to an upward direction.

[Item 11] The aircraft according to any one of items 1 to 10, wherein the airflow guide structure is placed in a portion in which the boom is supported by the wing body.

[Item 12] The aircraft according to item 11, wherein
the wing body includes a front wing and a rear wing, and
the airflow guide structure is placed in a portion in which the boom is supported by at least one of the front wing and the rear wing.

[Item 13] The aircraft according to any one of items 1 to 10, wherein
the wing body includes a front wing and a rear wing, and
the airflow guide structure is placed at a portion between locations where the boom is supported by the front wing and the rear wing.

What is claimed is:

1. An aircraft comprising:
fuselage;
a wing body that is provided to extend laterally from the fuselage and configured to generate lift during cruise;
a boom extending in a front-back direction that is supported by the wing body to be spaced apart from the fuselage;
a rotor that is supported on the boom, the rotor having one or more blades configured to generate thrust in a vertical direction during take-off and landing;
a cooling apparatus configured to cool the rotor by using a radiator arranged within the boom; and
an airflow guide structure provided in a part of the boom and configured to guide airflow, which is generated by rotation of the one or more blades rotating around a rotational axis of the rotor, to the radiator, wherein
the airflow guide structure includes an inlet that is provided on a surface of the boom positioned below a plane of the rotation of the one or more blades, and
the inlet faces opposite to a direction of a movement of the rotating one or more blades.

2. The aircraft according to claim 1, wherein the inlet is provided between an upper portion and a side portion of the boom.

3. The aircraft according to claim 1, wherein the inlet is provided on the boom and tilted relative to the rotational axis of the rotor to face toward a rotational direction of the one or more blades with respect to an upward direction.

4. The aircraft according to claim 2, wherein the inlet is provided on the boom and tilted relative to the rotational axis of the rotor to face toward a rotational direction of the one or more blades with respect to an upward direction.

5. The aircraft according to claim 1, wherein the airflow guide structure further includes an outlet provided on a lower side of the boom.

6. The aircraft according to claim 2, wherein the airflow guide structure further includes an outlet provided on a lower side of the boom.

7. The aircraft according to claim 3, wherein the airflow guide structure further includes an outlet provided on a lower side of the boom.

8. The aircraft according to claim 5, wherein the outlet is positioned on a side of a lower portion of the boom, the side following a rotational direction of the one or more blades relative to a rotational axis of the rotor.

9. The aircraft according to claim 5, wherein the outlet is positioned on a side of a lower portion of the boom, the side being opposite from the inlet with respect to the rotational axis of the rotor.

10. The aircraft according to claim 8, wherein the outlet is positioned on a side of a lower portion of the boom, the side being opposite from the inlet with respect to the rotational axis of the rotor.

11. The aircraft according to claim 5, wherein the outlet is formed to face more downward relative to the inlet.

12. The aircraft according to claim 8, wherein the outlet is formed to face more downward relative to the inlet.

13. The aircraft according to claim 5, wherein the radiator is arranged between the inlet and the outlet within the boom.

14. The aircraft according to claim 8, wherein the radiator is arranged between the inlet and the outlet within the boom.

15. The aircraft according to claim 13, wherein the radiator is tilted relative to the rotational axis of the rotor and one plane of the radiator faces toward the inlet and/or another plane of the radiator faces toward the outlet.

16. The aircraft according to claim 5, wherein the boom includes a lower-side beam that is installed on a lower side of the outlet.

17. The aircraft according to claim 8, wherein the boom includes a lower-side beam that is installed on a lower side of the outlet.

18. The aircraft according to claim 1, wherein the boom includes an upper-side beam that is installed on an upper side of the inlet.

19. The aircraft according to claim 2, wherein the boom includes an upper-side beam that is installed on an upper side of the inlet.

* * * * *